(12) United States Patent
Jensen et al.

(10) Patent No.: US 6,638,155 B2
(45) Date of Patent: Oct. 28, 2003

(54) APPARATUS FOR AND A METHOD OF SEPARATING AN ORGAN FROM A SET OF ORGANS FROM A CARCASS

(75) Inventors: Carsten Jensen, Roskilde (DK); Niels R. Jensen, Hellerup (DK); Søren Dybdal, Birkerød (DK)

(73) Assignee: Slagteriernes Forskninstitut, Rosskilde (DK)

( * ) Notice: Subject to any disclaimer, the term of this patent is extended or adjusted under 35 U.S.C. 154(b) by 0 days.

(21) Appl. No.: 09/951,386

(22) Filed: Sep. 14, 2001

(65) Prior Publication Data
US 2003/0148725 A1 Aug. 7, 2003

(30) Foreign Application Priority Data
Sep. 15, 2000 (DK) .......................................... 2000 1373

(51) Int. Cl.⁷ ................................................ A22B 5/18
(52) U.S. Cl. ...................... 452/117; 452/106; 452/177; 452/111
(58) Field of Search ........................ 452/177, 117, 452/106, 111

(56) References Cited

U.S. PATENT DOCUMENTS

| | | | | |
|---|---|---|---|---|
| 4,019,222 A | * | 4/1977 | Scheier et al. ............... | 452/117 |
| 4,382,313 A | | 5/1983 | Harben, Jr. et al. | |
| 5,098,333 A | * | 3/1992 | Cobb ........................ | 452/117 |
| 5,186,678 A | * | 2/1993 | Conner et al. ............... | 452/106 |
| 5,318,428 A | | 6/1994 | Meyn | |
| 5,549,521 A | * | 8/1996 | van den Nieuwelaar et al. ........................ | 452/117 |
| 5,569,067 A | * | 10/1996 | Meyn ........................ | 452/106 |
| 5,755,617 A | * | 5/1998 | van Harskamp et al. ... | 452/106 |
| 5,954,575 A | * | 9/1999 | Norling ....................... | 452/177 |
| 6,244,425 B1 | * | 6/2001 | Volker et al. ................ | 452/177 |

FOREIGN PATENT DOCUMENTS

| | | |
|---|---|---|
| EP | 0 439 904 A1 A1 | 8/1991 |
| EP | 0 482 700 A1 | 4/1992 |
| EP | 0 541 150 A1 | 5/1993 |
| EP | 0 587 253 A2 A2 | 3/1994 |
| EP | 0 601 812 A2 | 6/1994 |
| EP | 0 711 501 A1 A1 | 5/1996 |
| EP | 0 769 247 B1 B1 | 4/1997 |
| GB | 1 415 153 | 6/1971 |
| GB | 2 004 175 A A | 3/1979 |
| NL | 541150 A1 * 12/1993 | .................. 452/106 |
| NL | 1001672 | 5/1997 |
| WO | WO 00/33661 | 6/2000 |

* cited by examiner

Primary Examiner—Peter M. Poon
Assistant Examiner—Joan M. Olszewski
(74) Attorney, Agent, or Firm—Sughrue Mion, PLLC

(57) ABSTRACT

The apparatus comprises: a running conveyor (1) with hooks (2) for suspending a set (5) of organs by the diaphragm (6) and conveying it in a conveying direction of the conveyor (1); a slit device (10; 11) arranged below the conveyor (1) with a slit (13; 44) for guiding horizontally in the slit a connective tissue part (9; 6) of the set (5) of organs during the conveyance of the set of organs on the conveyor with an organ (8; 7) located below the slit (13; 44), a retaining device (14–16; 40) arranged in a conveying path which the organ (8; 7) follows with the connective tissue part (9; 6) guided by the slit (13; 44), the retaining device (14–16; 40) being adapted to retain the organ (8; 7) on the retaining device by the conveyor's (1) pull in the set (5) of organs; and (22, 23; 49–51, 54) for causing separation between the organ (8; 7) and the connective tissue part (9; 6) when such retention has been provided.

24 Claims, 4 Drawing Sheets

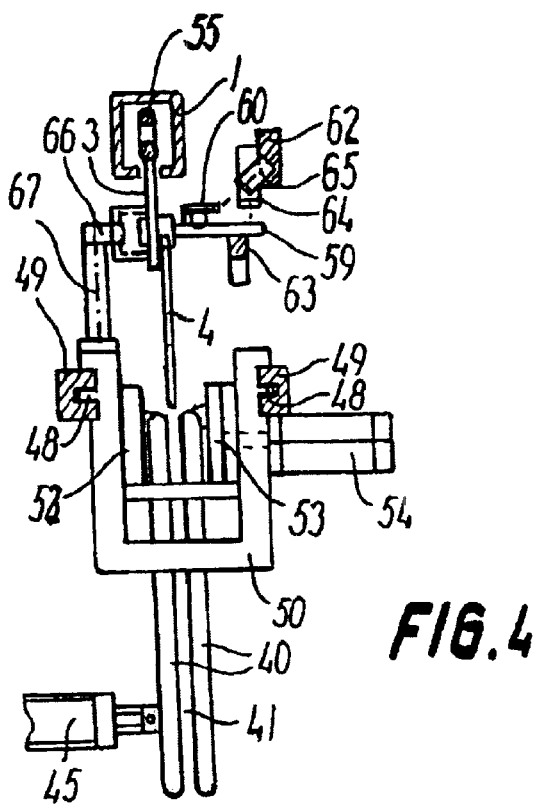
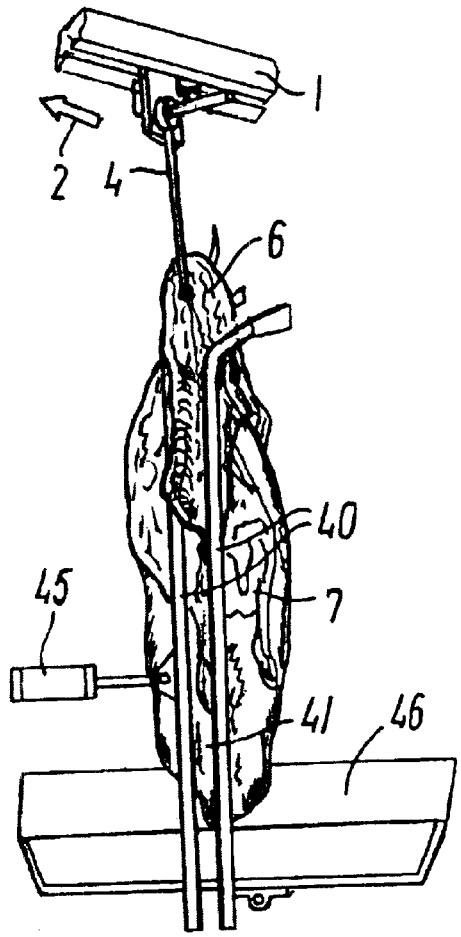
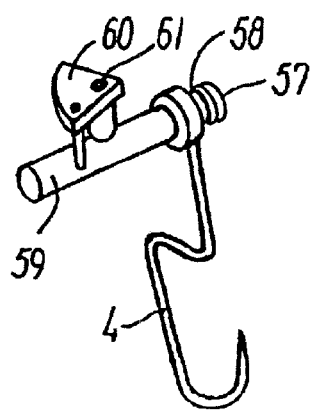
FIG.4
FIG.6
FIG.5

APPARATUS FOR AND A METHOD OF SEPARATING AN ORGAN FROM A SET OF ORGANS FROM A CARCASS

CROSS-REFERENCE TO RELATED APPLICATIONS

The present application claims the benefit of priority from Danish patent application No. PA 2000 01373 filed on Sep. 15, 2000.

BACKGROUND OF THE INVENTION.

The present invention relates to an apparatus for and a method of automatically separating at least one organ from a set of organs eviscerated from a carcass, which set of organs comprises a diaphragm and one or more organs.

EP-A-0 587 253 describes a method of separating one or more organs from a cluster of organs from a slaughtered animal, particularly a bird. According to this publication connective tissue can be broken by suspending a strong organ, such as a gullet, from a fixing device and influencing an organ in the cluster by a force in a direction away from the point of suspension. In one embodiment, two bend rods are closed around the gullet, and the fixing device is lifted, whereby the organs connected with the gullet are stripped off. In another embodiment, the suspended cluster is conveyed by a conveyor, parts of the cluster are passed between some rods and plates, and as these rods and plates diverge from the conveyor path, organs in the cluster are pulled away from other parts of the cluster during the conveyance.

It should be noted that the present invention relates to separation of organs in a set of organs comprising a diaphragm, and that birds, to which the above publication EP-A-0 587 253 relates, have no diaphragm. The invention is thus aimed particularly at sets of organs from carcasses of mammals, such as pigs, sheep, goats and cattle.

BRIEF SUMMARY OF THE INVENTION

The object of the invention is to provide an apparatus and a method of the type mentioned in the introduction, which render it possible to provide separated organs of good quality, that is, where the organs are whole and substantially free of other parts of the set of organs.

It is a particular object to provide separation of liver and/or kidneys from a set of organs containing these organs, whereby organs are obtained that require substantially no post-treatment, but can be used as they are.

It is a further object to provide an apparatus and a method that can utilize the conveyance of a set of organs of a pluck conveyor system in the slaughterhouse.

This is obtained by an apparatus which is characterized in comprising a running conveyor with hooks for suspending the set of organs by the diaphragm and conveying it in a conveying direction of the conveyor, a slit device arranged below the conveyor with a slit for guiding horizontally in the slit a connective tissue part of the set of organs during the conveyance of the set of organs on the conveyor with the said at least one organ located below the slit, a retaining device arranged in a conveying path which the said at least one organ follows with the connective tissue part guided by the slit, the retaining device being adapted to retain said at least one organ on the retaining device by means of the conveyor's pull in the set of organs, and means for causing separation of the said at least one organ and the connective tissue part when such retention has been provided.

The invention applies the fact that the organ is guided towards the retaining device and is here made to be retained by the conveyor's conveyance of the set of organs, whereupon a suitable separation of the organ can be made which keeps the organ intact while taking place in an area close to the organ. This more surely provides separation at the desired place in the set of organs.

In one embodiment, the slit device and the retaining device together comprise two portions which, between adjacent edges, define the slit for the connective tissue part with an inlet at an upstream end of the slit in relation to the conveying direction of the conveyor, this slit having a first section extending along the conveyor and a second section with retention surfaces on either side of the slit, which retention surfaces extend downwards in relation to the conveying direction of the conveyor so that the said at least one organ is retained on the retention surfaces by means of the conveyor's pull in the set of organs. This embodiment is suitable for pulling a liver off the diaphragm. Owing to the inclination of the retention surfaces in relation to the conveying direction of the conveyor, the liver will not, when it reaches the retention surfaces, let itself be pulled further in the longitudinal direction of the slit by the conveyor's pull in the diaphragm, so the diaphragm is gradually pulled free of the liver which remains at rest in relation to the retention surfaces until the diaphragm has been pulled free, whereupon the liver can fall down into a collection place.

In a second embodiment, the retaining device comprises a pair of curved surface parts which between them form a slit for the connective tissue part and are arranged in the conveying path of the said one organ, which surface parts form a cavity facing the said organ. In that connection a cutting device may also be provided behind the retaining device for cutting a connection between the connective tissue part and the said at least one organ. This embodiment is suitable for separating one kidney or two kidneys from the set of organs, the kidney or kidneys being retained securely while the connection to the connective tissue part, the so-called renal fat, is cut.

Other advantageous embodiments appear from the dependent apparatus claims.

The object is further obtained by a method which is characterized by the steps: the set of organs is suspended by the diaphragm in a running conveyor with hooks and conveyed in a conveying direction of the conveyor, a connective tissue part of the set of organs is guided horizontally in a slit in a slit device arranged below the conveyor during the conveyance of the set of organs on the conveyor with the said at least one organ located below the slit, the said at least one organ is retained on a retaining device arranged in a conveying path which the at least one organ follows with the connective tissue part being guided by the slit, the organ being retained on the retaining device by means of the conveyor's pull in the set of organs, and a separation is caused between the said at least one organ and the connective tissue part when the said retention has been provided. Advantageous embodiments appear from the dependent method claims.

In one embodiment, which is suitable for separation of a liver from the diaphragm, the connective tissue part is guided into an inlet of the slit which is located upstream in relation to the conveying direction of the conveyor and is found between adjacent edges of two portions comprised by the slit device and the holding device together, this slit having a first section extending along the conveyor and a second section with retention surfaces on either side of the slit, and the said at least one organ is retained on the retention surfaces by means of the conveyor's pull in the set of organs, these surfaces extending downwards in relation to the conveying direction of the conveyor.

In an embodiment suitable for separating one kidney or two kidneys from the set of organs, the at least one organ is guided into a cavity formed by a pair of curved surface parts comprised by the retaining device, the surface parts between them forming a slit for the connective tissue part and being arranged in the conveying path for the said one organ. The separation is then preferably provided by means of a cutting device behind the retaining device, the cutting device cutting a connection between the connective tissue part and the said at least one organ.

Other advantageous embodiments appear from the dependent method claims.

BRIEF DESCRIPTION OF THE SEVERAL VIEWS OF THE DRAWING

Further advantages of the invention will appear from the following, in which preferred embodiments will be described in further detail as non-limiting examples with reference to the very scematical drawing.

In the drawing:

FIG. 4 shows a detail of the apparatus of FIG. 3 seen in the direction of the arrow IV, FIG. 5 shows a detail of the apparatus of FIG. 3 seen in the direction of the arrow V, and FIG. 6 shows a detail of a hook suspension.

DETAILED DESCRIPTION OF THE INVENTION

Figure 1:
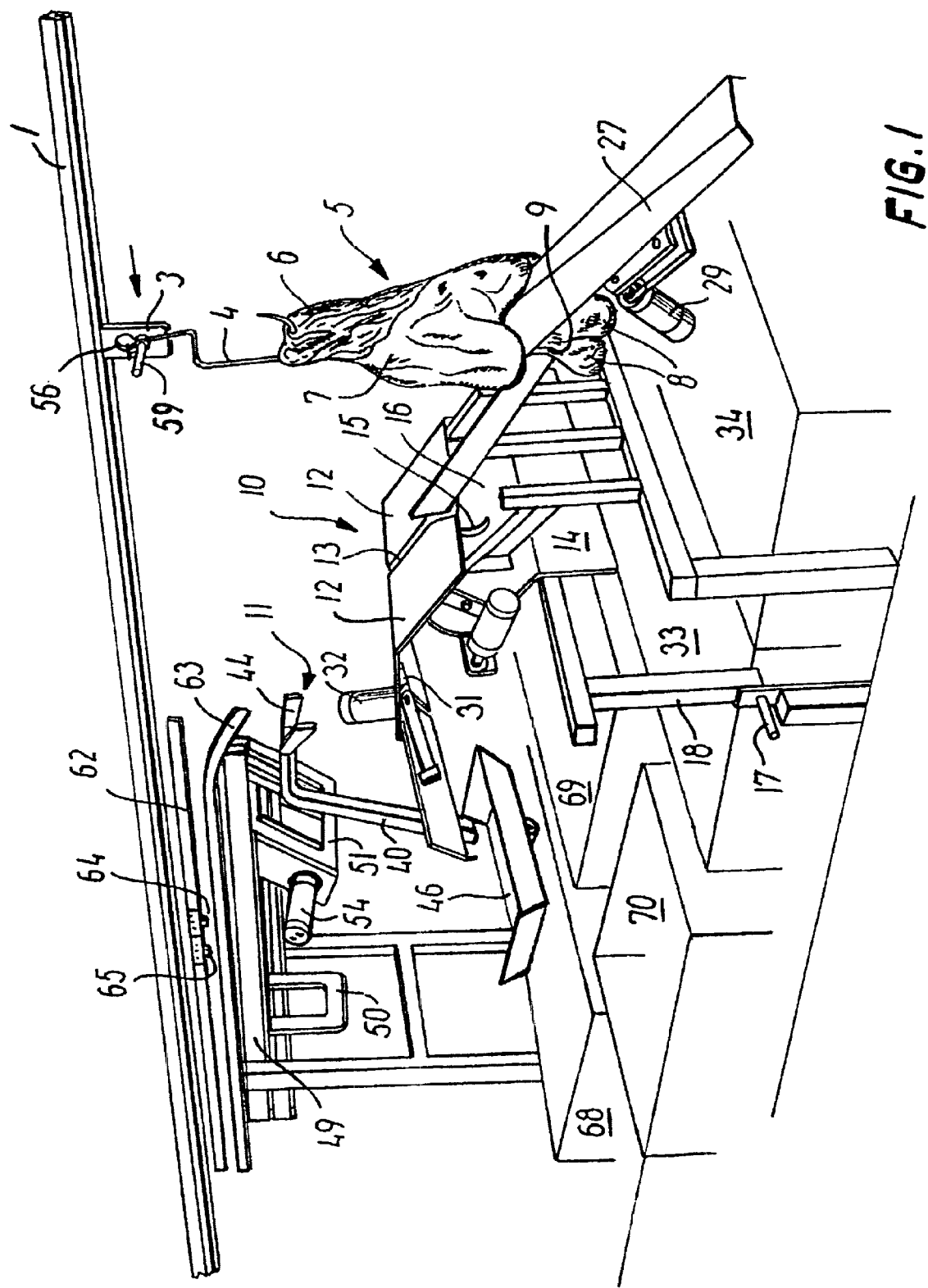
FIG. 1 shows a perspective view of an installation with two different apparatus according to the invention.

FIG. 1 shows a hollow rail 1 receiving a running chain of a conveyor system with a conveying direction 2. A hook 4 is suspended from a bracket plate 3, which extends from a chain link and out through a slot in the rail, and a set of organs 5 eviscerated from a carcass is suspended from the hook 4. The set of organs 5 comprises a diaphragm 6, through which the hook 4 has been thrust, a liver 7 and two kidneys 8. The kidneys 8 are connected with the diaphragm 6 by a connective tissue part called renal fat 9. This includes blood vessels and the ureter enclosed by a layer of fat.

The installation of FIG. 1 comprises a first apparatus 10 for separating the kidneys 8 from the set of organs 5 and a second apparatus 11 for separating the liver 7 from the diaphragm 6.

The apparatus 10 comprises a set of inclined plates 12 defining a slit 13 between them by adjacent edges for receiving the renal fat 9 for guiding the latter horizontally, as will be explained in further detail below.

Furthermore, the apparatus 10 comprises a retaining device with a pair of curved plate parts constituted by a plate 14 formed in one piece and having a slit 15. The plate 14 has a substantially cylindrical portion which forms a cavity 16 facing against the conveying direction 2. The plate 14 is mounted on arms 18 pivotable about a horizontal axis 17.

Figure 2:
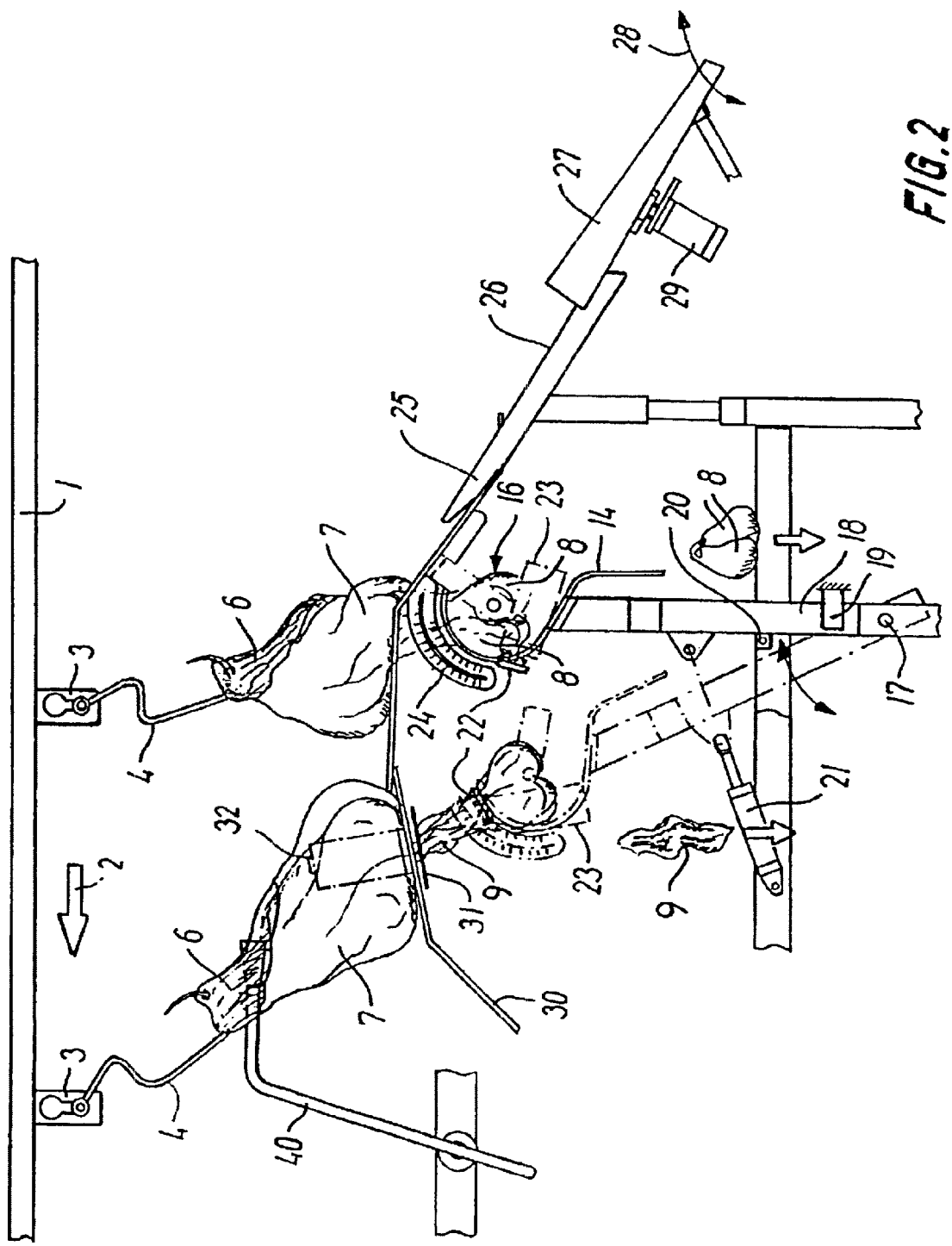
FIG. 2 shows a side view of the first apparatus of FIG. 1.
Figure 3:
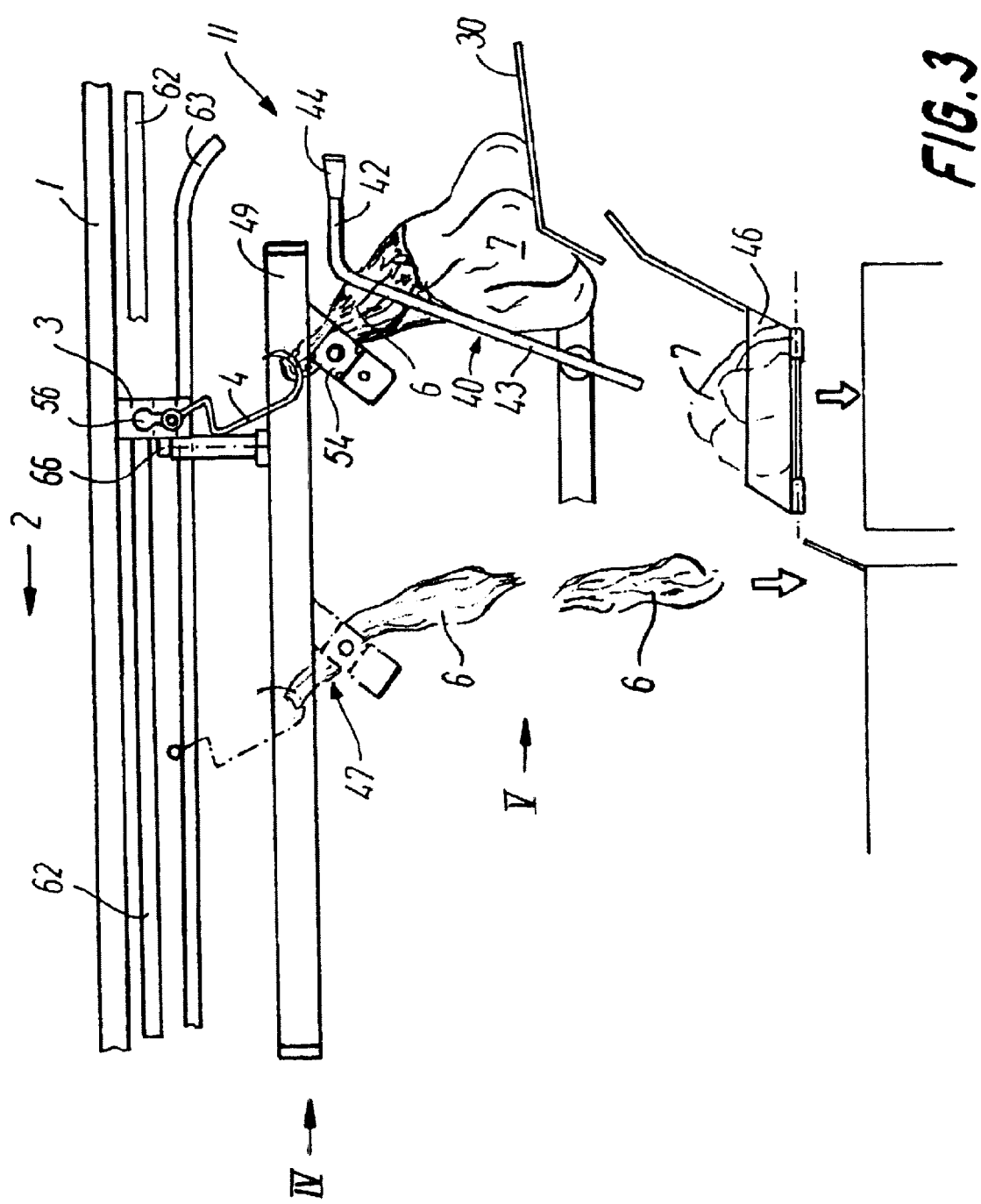
FIG. 3 shows a side view of the second apparatus of FIG. 1.

In a starting position shown in FIG. 2 by solid lines, the arms 18 of the retaining device are in frictional engagement with a resilient bracket plate 19 extending some distance in the downstream direction. There is a sensor 20 adapted to record when the arms 18 leave the starting position. Furthermore a pneumatic cylinder 21 is provided for returning the arms 18 to their starting position.

An oscillating knife 22 is mounted pivotably at the cylindrical portion of the plate 14. The knife 22 is driven by a motor 23 and by pivoting can be passed closely along the external side of the cylindrical portion of the plate 14 while oscillating in a direction parallel with the axis of rotation.

Downstream of the cylindrical portion of the plate 14 there is a gripping member in the form of two jaws 24, only one of which is visible in FIG. 2, the other being hidden behind the first one. The two jaws 24 can be moved towards and away from each other by the aid of means, not shown, such as a pneumatic cylinder.

At the inlet to the slit 13, the plates 12 are cut off obliquely so as to form a funnel-shaped inlet. The inlet is partially filled out by a pointed end of a guide rail 25 in the form of an angularly bent strip of steel plate with an upward longitudinal ridge 26.

Upstream of the guide rail 25 there is an oscillating rail 27 performing a wriggling motion 28 by means of a motor 29 in its assembly.

Downstream of the plates 12 there is another pair of plates 30 forming an extension of the slit 13. Below this extension there is a second oscillating knife 31, driven by means of a motor 32 in an oscillating motion transversely to the slit 13 and its extension.

The first apparatus 10 functions as follows:

The set of organs 5 is conveyed in the conveying direction 2 and reaches the oscillating rail 27, which imparts a sideways motion to the set of organs 5. The set of organs 5 is conveyed onwards along the guide rail 25. At the end thereof, the renal fat 9 slides into the inlet of the slit 13, while the liver 7 slides up along the inclined plates 12. The sideways motion facilitates the entry into the slit 13 of the renal fat 9, as the motion facilitates a positioning of the renal fat 9 relative to the liver 7 ensuring that the liver 7 is not between the renal fat 9 and the inlet.

The distance between the hook 4 and the apparatus 10 is adapted so that the kidneys 8 pass below the plates 12 and into the cavity 16 in the retaining device, the renal fat 9 sliding into the slit 15 located below the slit 13. Since the kidneys 8 cannot pass the slit 15, they are caught in the cavity 16.

The further conveyance of the hook 4 causes the renal fat 9 to be stretched out and to pull the retaining device forwards, the arms 18 pivoting about the axis 17. The first part of this pivotal motion occurs at a substantially constant tractive force in the renal fat 9 owing to the friction between the arm 18 and the resilient bracket plate 19.

The motion of the arm 18 is recorded by the sensor 20, which transmits a signal to control means, not shown, which again actuate the jaws 24, which clamp around the renal fat 9 and retain it, and the oscillating knife 22 which oscillates while being pivoted along the cylindrical portion of the plate 14 thereby cuts the renal fat near the kidneys 8, which then lie free in the cavity 16.

While the kidneys 8 are being cut free, the arms 18 and together with them the retaining device tilt forwards due to gravity after the arm 18 is released from the frictional engagement with the resilient bracket plate 19, The retaining device reaches the position shown in dashed lines, and the upper end of the renal fat 9 is swung towards the second oscillating knife 31, which cuts the renal fat 9 near its connection to the diaphragm 6.

The jaws 24 now separate and let the renal fat 9 cut free drop down on a renal fat conveyor or into a renal fat collection box 33. The cylinder 21, so far non-pressurized, is now actuated to bring the arms 18 and the retaining device back to the starting position. This alters the inclination of the plate 14, and the kidneys 8 fall out of the cavity 16 and down on a kidney conveyor or into a kidney collection box 34.

The set of organs 5, now only comprising the diaphragm 6 and the liver 7, continues to the second apparatus 11.

The second apparatus comprises two bend rods 40 extending in parallel and between them defining a slit 41. The bend rods 40 and thus the slit 41 have a first portion 42 extending horizontally and a second portion 43 extending obliquely downwards. Furthest upstream the bend rods 40 diverge in the direction opposite to the conveying direction 2 to provide an inlet 44. One bend rod is fixed while the other can be moved away from and towards the first bend rod by means of a pneumatic cylinder 45.

Under the bend rods 40 is a tray 46 that can be tilted by the aid of means, not shown, as will be explained below.

Downstream of the bend rods 40 there is a device for gripping the diaphragm 6 and pulling it forwards in cooperation with the hook 4. This device comprises a carriage 47 with guide fins 48 which slide in guideways in guide rails 49. The carriage comprises a U-shaped frame part 50 at its front end and a second, inclined, U-shaped frame part 51 at its back end. The latter frame part 51 carries two jaws 52, 53, the first jaw 52 of which is fixed, while the other jaw 53 can be moved towards the first jaw 52 by means of a pneumatic cylinder 54 to grip the diaphragm 6, as will be explained below.

FIG. 4 shows how the bracket plate 3 is fastened to a chain link 55 of the chain running in the rail 1. The bracket plate 3 has a keyhole-shaped hole 56 in which a pin 57 of the hook 4 provided with a recess 58 has been received in order to connect the hook 4 pivotably with the bracket plate 3. Opposite the pin 57, the hook 4 has a longer pin 59 acting as a guide and indicator, as will be explained below. On an upright pin, the pin 59 carries an indicator disc 60 shaped like a quarter of a circle and being pivotable about a vertical axis 61 between two positions, one of which is shown in FIG. 6 while in its other position the disc 60 is pivoted by 90° counterclockwise in relation to the Figure.

Along the rail 1 there are two further rails 62 and 63. The top one thereof, the rail 62, carries two inductive sensors 64 and 65, whose function will be described below. The lower rail of the two, the rail 63, is adapted to engage with the long pin 59 of the hook 4 to ensure that this pin 59 passes close by the sensors 64 and 65.

The carriage 47 carries a pawl 66 which is pivotable about a vertical axis 67 to get into or out of engagement with the bracket plate 3, as will be explained below.

The second apparatus 11 functions as follows:

After the set of organs 5 has passed the first apparatus 10, the diaphragm 6 is passed into the inlet 44 of the slit 41 between the two bend rods 40 and onwards into the actual slit 41, the liver 7 being passed underneath the first portion 42 of the bend rods 40. As the liver 7 reaches the second portion 43, it will be retained, and owing to the inclination of the second portion 43 of the bend rods 40, the liver 7 will be retained and not slide along the second portion 43, while the diaphragm 6 is stretched owing to the pull from the hook 4.

At this time the long pin 59 has slid in over the rail 63 and has reached the sensor 64, which detects the arrival of the pin 59. This makes the sensor 64 transmit a signal which actuates the cylinder 54 and makes the jaws 52 and 53 grip and retain the diaphragm 6, as well as makes a power means, not shown, swing the pawl 66 into engagement with the bracket plate 3 as shown in FIG. 4. The latter causes the carriage 47 to follow the motion of the conveyor and, by means of the grip on the diaphragm 6 by the jaws 52 and 53, to contribute to pulling the diaphragm 6 free of the liver 7. The liver 7 then falls down on the tray 46.

When the carriage 47 has moved a specified distance together with the conveyor, the pawl 66 is swung out of engagement with the bracket plate 3, and the carriage reaches a stop, not shown. The further conveyance of the hook 4 causes it to be torn out of the diaphragm 6. When the hook 4 is free of the diaphragm 6, the jaws 52 and 53 open, and the diaphragm falls down into a diaphragm collection box 68 or on to a diaphragm conveyor. Then a power means, not shown, returns the carriage 47 to its starting position.

Before the set of organs 5 reaches the apparatus 10, an operator has examined the quality of the liver 7 and set the indicator disc 60 in one of its two positions mentioned, one position indicating that the liver is flawless, the other position indicating that it is not flawless, but has spots, for example. The sensor 65 senses whether the indicator disc 60 is in one position shown in FIG. 6 or is not, as is the case in FIG. 4, and accordingly transmits a signal causing the tray 46 to tilt to one or the other side after having received the liver 7, for example when the carriage 47 is returned to its starting position. Thus, a flawless liver 7 will fall into a liver collection box 69 or on to a liver conveyor, and a flawed liver 7 will drop down into another liver collection box 70 or on to another liver conveyor.

Finally, the bend rods 40 are moved away from each other and back again to release parts of the set of organs 5 that may have remained hanging there owing to faulty function. The tray is tilted to let such parts fall down into the second liver collection box 70.

The invention being thus described, it will be obvious that the same may be varied in many ways. Such variations are not regarded as a departure from the spirit and scope of the invention, and all such modifications as would be obvious to one skilled in the art are intended to be included within the scope of the following claims.

We claim:

1. An apparatus for automatically separating at least one organ from a set of organs eviscerated from a carcass, which set of organs comprises a diaphragm and at least one organ, wherein the apparatus comprises:

a running conveyor with hooks for suspending the set of organs by the diaphragm and conveying it in a conveying direction of the conveyor, a slit device arranged below the conveyor with a slit for guiding horizontally in the slit a connective tissue part of the set of organs during the conveyance of the set of organs on the conveyor with the said at least one organ located below the slit, a retaining device arranged in a conveying path which the said at least one organ follows with the connective tissue part guided by the slit, wherein said at least one organ is retained on the retaining device by at least the conveyor's pull on the set of organs, and means for causing separation between the said at least one organ and the connective tissue part while such retention is provided, wherein downstream of the retaining device there is a gripping member for gripping the connective tissue part.

2. The apparatus according to claim 1, wherein the slit device and the retaining device together comprise two portions which, between adjacent edges, define the slit for the connective tissue part with an inlet at an upstream end of the slit in relation to the conveying direction of the conveyor, and wherein this slit has a first section extending along the conveyor and a second section with retention surfaces on either side of the slit, which retention surfaces extend downwards in relation to the conveying direction of the conveyor so that said at least one organ is retained on the retention surfaces by at least the conveyor's pull on the set of organs.

3. An apparatus according to claim 2, wherein the slit device and the retaining device are together constituted by two rods extending in parallel forming between them the said slit for the connective tissue part and, extending respectively at a first rod section along the conveying direction of the conveyor and, at a second rod section, extending downwards away from the conveyor to retain said at least one organ on the second rod sections by at least the conveyor's pull on the set of organs.

4. An apparatus according to claim 2, wherein the two portions are controllably movable towards and away from each other.

5. The apparatus according to claim 1, wherein the retaining device comprises a pair of curved surface parts which between them form a slit for the connective tissue part and are arranged in the conveying path of said at least one organ, which surface parts form a cavity facing said organ.

6. An apparatus according to claim 1, wherein a cutting device is provided behind the retaining device for cutting a connection between the connective tissue part and the said at least one organ.

7. An apparatus according to claim 6, wherein the cutting device is adapted to cut a connection between a renal fat part and one kidney.

8. An apparatus according to claim 7, further comprising a cutting device for cutting a connection between the renal fat and the diaphragm.

9. An apparatus according to claim 1, wherein the gripping member is adapted to grip the diaphragm and pull it in the conveying direction of the conveyor and, together with the retaining device, to cause separation of the diaphragm and a liver being retained by the retaining device.

10. An apparatus according to claim 1, wherein the gripping member is adapted to grip a renal fat part and retain it at its separation from one kidney and at the separation of the renal fat from the diaphragm.

11. An apparatus according to claim 1, wherein upstream of the slit device there are means for positioning the set of organs, and the slit device has contact surfaces for a liver to which surfaces a positioned set of organs is delivered and along which the liver is guided during the conveyance of the set of organs in the conveyor.

12. An apparatus according to claim 1, wherein the slit device comprises a set of inclined plates with the slit between them, which plates are arranged at such height in relation to the conveyor that kidneys in the set of organs go below the plates while a liver slides above the plates, and the renal fat, which is a connection between the kidneys and the set of organs slides in the slit.

13. An apparatus according to claim 1, wherein the retaining device is suspended for movement in a determined path as a consequence of the pull on the set of organs, and a detector is adapted to record such movement and cause actuation of a cutting device and the gripping member.

14. A method of automatically separating at least one organ from a set of organs eviscerated from a carcass, which set of organs comprises a diaphragm and at least one organ, wherein the method comprises the following steps:

the set of organs is suspended by the diaphragm in a running conveyor with hooks and conveyed in the conveying direction of the conveyor, a connective tissue part of the set of organs is guided horizontally in a slit device arranged below the conveyor during the conveyance of the set of organs on the conveyor with the said at least one organ located below the slit, the said at least one organ is retained on a retaining device arranged in a conveying path which the at least one organ follows with the connective tissue part being guided by the slit, the organ being retained on the retaining device by at least the conveyor's pull on the set of organs, and separation is caused between the said at least one organ and the connective tissue part while the said retention is provided, wherein the connective tissue part is gripped downstream of the retaining device by means of a gripping member.

15. The method according to claim 14, wherein the connective tissue part is guided into an inlet of the slit which is located upstream in relation to the conveying direction of the conveyor and is found between adjacent edges of two portions comprised by the slit device and the retaining device together, this slit having a first section extending along the conveyor and a second section with retention surfaces on either side of the slit, and said at least one organ is retained on the retention surfaces by at least the conveyor's pull on the set of organs, these surfaces extending downwards in relation to the conveying direction of the conveyor.

16. A method according to claim 15, wherein the two portions are moved away from and towards each other after the said separation.

17. The method according to claim 14, wherein the at least one organ is guided into a cavity formed by a pair of curved surface parts comprised by the retaining device, the surface parts between them forming a slit for the connective tissue part and being arranged in the conveying path for said one organ.

18. A method according to claim 14, wherein the separation is effected by means of a cutting device behind the retaining device, the cutting device cutting a connection between the connective tissue part and the said at least one organ.

19. A method according to claim 18, wherein the connection between a renal fat part and one kidney is cut by means of the cutting device, and a connection between the renal fat and the diaphragm is cut by means of a further cutting device.

20. A method according to claim 19, wherein the renal fat is gripped by means of the gripping member downstream of the retaining device and is retained when the renal fat is cut off from the kidney and when the renal fat is cut off from the diaphragm.

21. A method according to claim 14, wherein the diaphragm is gripped by means of the gripping member and is pulled by means of it in the conveying direction of the conveyor, the diaphragm being thereby separated from a liver being retained by the retaining device.

22. A method according to claim 14, wherein the set of organs is positioned upstream of the slit device and that as the set of organs is delivered to the slit device, a liver is guided along contact surfaces on the slit device during the conveyance of the set of organs in the conveyor.

23. A method according to claim 14, wherein one kidney in the set of organs is passed below a set of inclined plates of the slit device, a liver is being made to slide above the plates, and the renal fat, which is a connection between the kidneys and the set of organs, is passed into the slit.

24. A method according to claim 14, wherein the retaining device is moved in a determined path owing to the pull in the set of organs, a detector records such movement and causes actuation of a cutting device and the gripper member for gripping and retaining the connective tissue part.

* * * * *